United States Patent

Yoshizawa et al.

[11] Patent Number: 5,436,995
[45] Date of Patent: Jul. 25, 1995

[54] OPTICAL FIBER CONNECTOR UNIT AND OPTICAL FIBER CONNECTOR

[75] Inventors: Takashi Yoshizawa, Hidaka; Shigemitsu Oguchi, Tokorozawa; Akira Nagayama; Kazunori Kanayama, both of Tokyo; Kuniharu Kato, Ibaraki; Yashuhiro Ando, Houya, all of Japan

[73] Assignee: Nippon Telegraph and Telephone Corporation, Tokyo, Japan

[21] Appl. No.: 240,622

[22] Filed: May 11, 1994

[30] Foreign Application Priority Data

May 14, 1993 [JP] Japan .................. 5-112552
May 20, 1993 [JP] Japan .................. 5-118333

[51] Int. Cl.⁶ ...................................... G02B 6/38
[52] U.S. Cl. .................................. 385/86; 385/69; 385/75; 385/87; 385/136
[58] Field of Search .................... 385/60, 69, 70, 75, 385/78, 86, 87, 136

[56] References Cited

U.S. PATENT DOCUMENTS

| | | | |
|---|---|---|---|
| 4,804,243 | 2/1989 | Borsuk et al. | 350/96.20 |
| 4,944,568 | 7/1990 | Danbach et al. | 350/96.20 |
| 5,016,970 | 5/1991 | Nagase et al. | 385/78 |
| 5,129,023 | 7/1992 | Anderson et al. | 385/70 |
| 5,212,752 | 5/1993 | Stephenson et al. | 385/78 |
| 5,251,279 | 10/1993 | Shibata et al. | 385/86 |
| 5,261,019 | 11/1993 | Beard et al. | 385/60 |
| 5,265,183 | 11/1993 | Feng et al. | 385/78 |
| 5,287,425 | 2/1994 | Chang | 385/81 |
| 5,311,609 | 5/1994 | Abe | 385/60 |

FOREIGN PATENT DOCUMENTS

| | | |
|---|---|---|
| 0223608 | 5/1987 | European Pat. Off. . |
| 61-204608 | 9/1986 | Japan . |
| 63-289512 | 11/1988 | Japan . |
| 64-506 | 1/1989 | Japan . |
| 2-251917 | 10/1990 | Japan . |
| 4-97107 | 3/1992 | Japan . |
| 88-07691 | 10/1988 | WIPO . |

Primary Examiner—Frank Gonzalez
Attorney, Agent, or Firm—Spencer, Frank & Schneider

[57] ABSTRACT

An optical fiber connector unit is composed of a ferrule including a first flange and a second flange formed to have a greater diameter than other portions, a stopring provided outside of the ferrule, having on its inner peripheral surface a first step and a second step, a coil spring having one end contacting with the first flange end face and the other end contacting with the first step end face, its tip exerting a spring force in an axial direction towards outside from the stopring; and a locating member provided between the stopring and the ferrule and having a first stopper contacting with the second step end face and a second stopper contacting with the second flange end face. The optical fiber connector using the unit can easily be assembled. The optical fiber connector, which does not require rotational positioning in assembly, has a flange-formed projection on the outer peripheral surface of the stopring, a plug frame having an opening engaging with the outer peripheral surface has a protrusion for engaging with the projection to prevent the stopring from passing to an opening end side, and having a relation of $D_2 > -d_1 > D_1$ where $D_1$ being a diameter of a circle including the inner peripheral surface of the protrusion, $D_2$ being a diameter of a circle including the inner peripheral surface other than the protrusion, and $d_1$ being a diameter of a circle including a tip of the projection of the stopring.

17 Claims, 21 Drawing Sheets

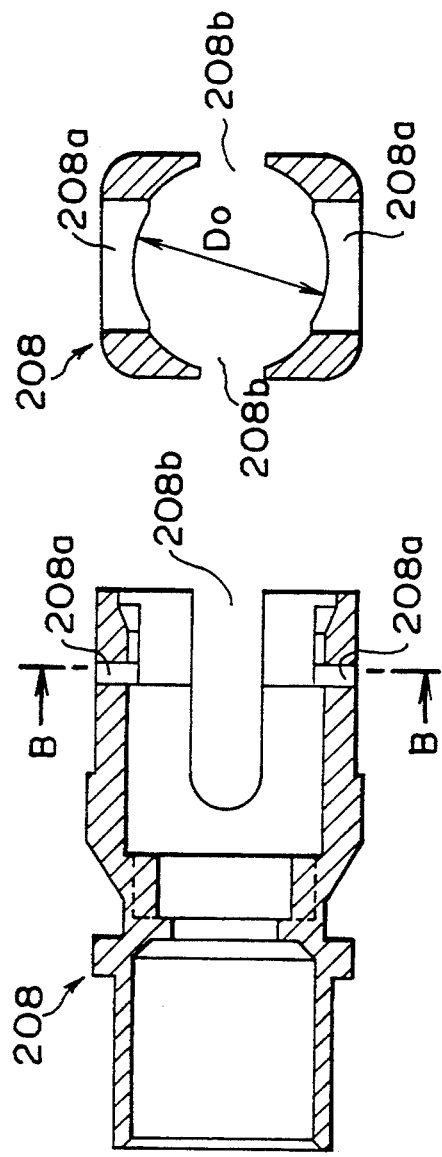
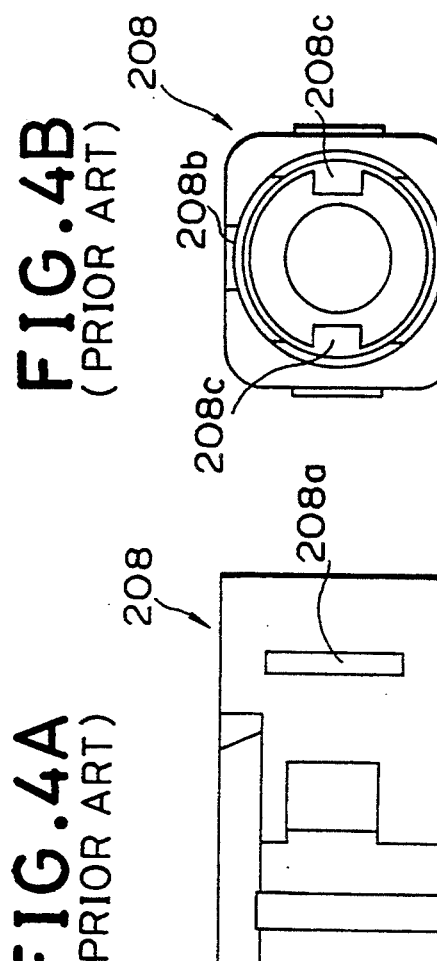
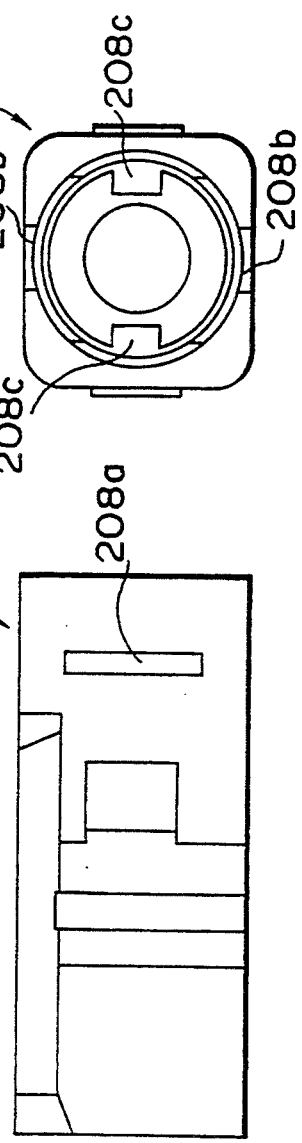
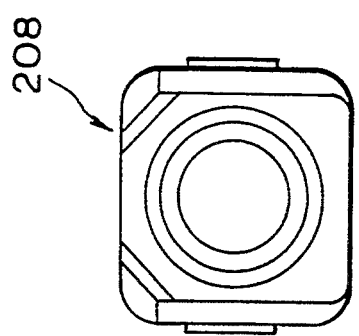
FIG. 4A (PRIOR ART)
FIG. 4B (PRIOR ART)
FIG. 4C (PRIOR ART)
FIG. 4D (PRIOR ART)
FIG. 4E (PRIOR ART)

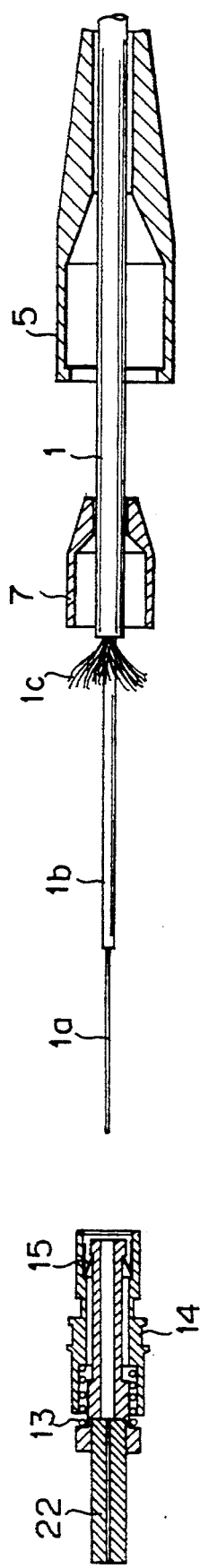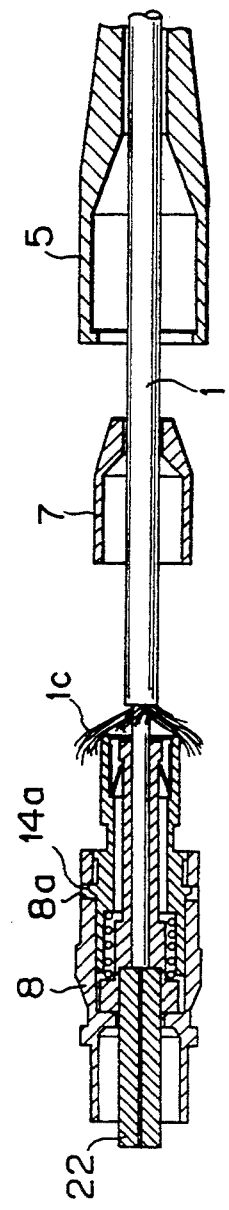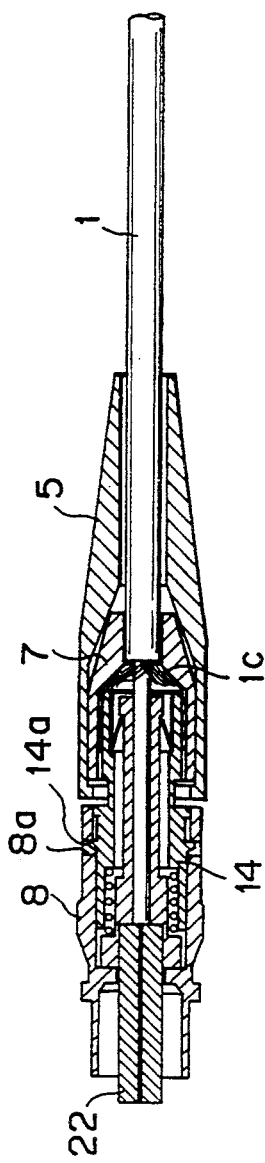
FIG. 16A
FIG. 16B
FIG. 16C

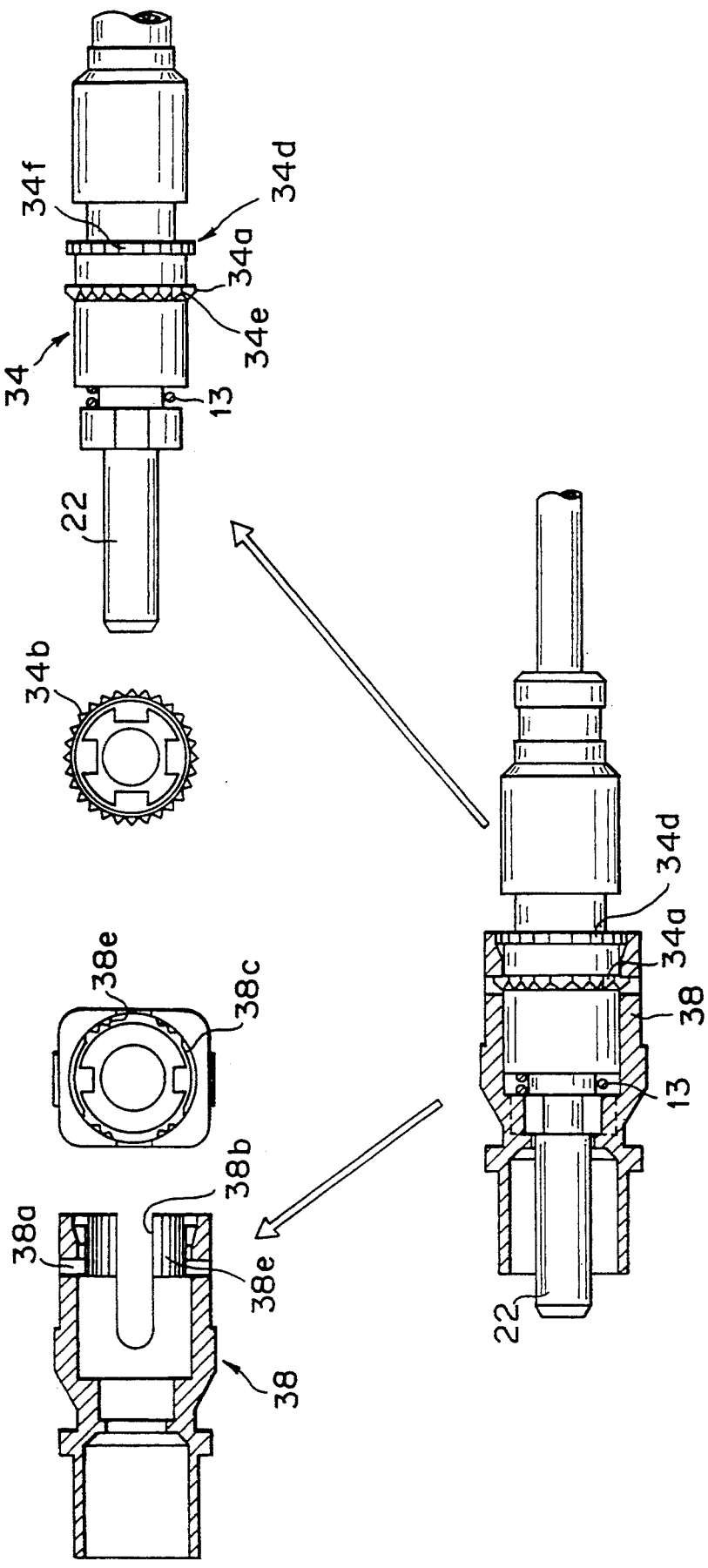

OPTICAL FIBER CONNECTOR UNIT AND OPTICAL FIBER CONNECTOR

BACKGROUND OF THE INVENTION

1. Field of the Invention

The present invention relates to an optical fiber connector unit which, in an assembly process of an optical fiber connector to an optical fiber cord (hereinafter referred to as "assembly"), simplifies the assembly in an automatic assembly line, and is labor-saving with a manual assembly, and to an optical connector having the optical fiber connector unit.

2. Description of the Prior Art

In contrast to fusion splicing for permanently connecting optical fibers, an optical connector is a joining device capable of detachably connecting optical fibers with one another. Various types of optical connectors are known which can easily connect and disconnect optical fibers.

To promote further popularization of wide area information services including video information to individual homes and offices, an economical optical fiber connector is essential. Heretofore, optical fiber connectors were composed of a number of parts, which have been highly dependent on manual assembly processes. As a result, 50% of the total cost is accounted for by the assembly cost, which has impeded reducing the cost of the optical fiber connector. Therefore, in order to meet the needs for optical connectors in the future and provide an economical optical fiber connector, it is necessary to automate the assembly work, thereby improving the productivity and reducing the assembly cost.

To achieve an automatic assembly apparatus for optical fiber connector at a reasonable cost, it is necessary to simplify the mechanism and assembly process as much as possible for this purpose, it is preferable to reduce the number of components of the optical fiber connector and simplify the structure of the connector so that the assembly process can be simplified.

Optical fiber connectors that are presently used are broadly divided into a bayonet fastening type, such as an ST-type connector, and a push-pull fastening type, such as an SC-type connector.

The ST-type connector, which was developed by AT & T of the United States, has a structure in which a ferrule and a spring are preassembled with a bayonet coupling nut. The three parts (ferrule, spring, and coupling nut) are supplied in an integrated form.

FIGS. 1A to 1C are schematic views showing the connector structure and assembly procedure of the ST-type connector. As shown in FIGS. 1A to 1C, a ferrule 102 for holding an optical fiber 101a and an optical fiber strand 101b having a jacket is previously incorporated in a bayonet type coupling nut 104, together with a spring 103 to form a plug unit 105. The optical fiber cord 101 is retained to the ferrule 102 of the plug unit 105 using a crimp ring 106. A hood 107 for protecting the retained portion is engaged with the coupling nut 104, thus forming an optical fiber connector.

In assembling the ST-type optical fiber connector shown in FIG. 1A, after optical fiber cord 101 is inserted into hood 107 and crimp ring 106, a sheath of an end portion, a strand jacket of optical fiber strand 101b, and a primary coating are removed to expose the optical fiber 101a. A tension member 101c, such as an aromatic polyamide Kevlar ®, is cut and formed properly. Then, as shown in FIG. 1B, optical fiber 101a and optical fiber strand 101b are inserted into ferrule 102, which is filled with an adhesive, and fixed therein. Tension member 101c is put over a rear end of ferrule 102 and crimp ring 106 is engaged thereto. Crimp ring 106 subsequently crimped to retain it to the rear end of ferrule 102. Finally, as shown in FIG. 1C, hood 107 is engaged with coupling nut 104 to cover crimp ring 106.

Since the ST-type connector comprises three parts (ferrule 102, spring 103, and coupling nut 104), the assembly time can be reduced over other types of connectors. However, the St-type connector uses tension member 101c to resist against an external force applied to optical fiber cord 101, thus protecting optical fiber strand 101b. Since tension member 101c is retained directly to ferrule 102 a small gap is formed between the ferrule end faces, which may break optical signals. Furthermore, the ST-type connector may be directly affected by an eccentric error generated in the production of the ferrule and the optical fiber. That is, when ST-type connectors differing in eccentric direction are connected, a deviation occurs between cores of the abutted optical fibers in the ferrules, which increases insertion loss (the insertion loss is the largest in a worst case scenario where eccentric directions differ by 180 degrees).

An F04 type single-core optical fiber connector (JIS 5973, hereinafter referred to as "SC-type connector"), which solves the problems of open circuit and increases in insertion loss present in the St-type connector, has a floating mechanism in which the ferrule floats from a stopring. The SC-type connector incorporates a core eccentricity adjusting mechanism for adjusting eccentricity in itself. As a result, the SC-type connector is used worldwide as a high-precision and reliable optical communication connector.

FIG. 2A and FIG. 2B are schematic views showing a structure and an assembly process of the SC-type connector. As shown in FIGS. 2A and 2B, the SC-type connector has a ferrule 202, a spring 203, a stopring 204, a boot 205, a ring 206, and a crimp ring 207 assemblable with an optical fiber cord and using a plug frame 208 retained to the stopring 204.

Structures of stopring 204 and plug frame 208 will be described in detail.

FIG. 3A is a partly cutaway schematic front view showing stopring 204. FIG. 3B is a left side view of stopring 204. As shown in the FIGS. 3A and 3B, stopring 204 has protrusions 204a projecting in the radial direction at two positions opposing each other on the outer peripheral surface.

FIG. 4A is a schematic longitudinal sectional view of plug frame 208. FIG. 4B is a cross sectional view of plug frame 208 taken along line A—A, and FIG. 4C is a schematic front view of FIG. 4A. FIG. 4D is a schematic left side view of FIG. 4C, and FIG. 4E is a schematic right side view of FIG. 4C. As shown in FIGS. 4A to 4E, two positions opposing each other on the inner peripheral surface of plug frame 208 are provided with holes 208a where projections 204a of stopring 204 are inserted. An inner diameter $D_0$ between holes 208a is set smaller than an outer diameter $d_0$ (see FIG. 3) between projections 204a of stopring 204. Plug frame 208 has a cutout 208b extending from an opening end and in the axial direction cutout 208b is at a position rotated 90 degrees from the holes 208a in a peripheral direction to allow elastic deformation of plug frame 208 to open the opening.

With the opening of plug frame 208 opened, stopring 204 is inserted into the plug frame and, projection 204a inserted in hole 208a. An external force is removed, and plug frame 208 returns to its original position due to its elasticity, so that stopring 204 is retained through projection 204a to plug frame 208, as shown in FIGS. 5A and 5B.

In assembling the SC-type connector having stopring 204 and the frame 208, first, as shown in FIG. 2A, the optical fiber cord 201 is inserted into stopring 204, and through coil spring 203, along with boot 205, ring 206, and crimp ring 207. Optical fiber 201 is pretreated i.e., the sheath, jacket and the primary coating are removed so that optical fiber 201a, optical fiber strand 201b, and tension member 201c are exposed. Then, as shown in FIG. 2B, ferrule 202, which is separately supplied, is bonded to the tip of optical fiber cord 201. In this condition, the individual inserted parts are held with the insertion positions undetermined relative to the optical fiber cord 201.

Subsequently, a core adjusting step is performed for the ferrule, which is polished to a convex-curved surface. Specifically, to set the eccentric direction of plug frame 208 with respect to the center of ferrule 202, the ferrule 202 is positioned at a first rotational position so that flange cutout 202a and inner projection 208c (see FIG. 4E) are in line. Then, coil spring 203 and stopring 204 are released and the parts are assembled. At this point, stopring 204 is positioned at a second rotational position so that the two projections 204a, provided on the stopring 204, are engaged with holes 208a of plug frame 208, and inserted as shown in FIG. 6B. FIG. 7 shows relative positions in an assembled condition of optical fiber cord 201, stopring 204, spring 203, and ferrule 202. The assembly of these components is all performed manually.

With the condition shown in FIG. 6B, as shown in FIG. 2C, crimp ring 207 is crimped with tension member 201c inserted between stopring 204 and crimp ring 207 to retain the cord. Boot 205 is set in position. In this case, ring 206 is used to retain the sheath to the end of crimp ring 207; alternatively, an adhesive may be used in place of ring 206. Finally, the coupling device is assembled as shown in FIG. 2D. In the coupling condition, ferrule 202 is pressed toward the left direction in FIG. 2 by a spring force caused by coil spring 203. An end of ferrule 202 contacts with stopring 204, and is floatingly supported to stopring 204 through coil spring 203.

To automate the above-described assembly process of the conventional SC-type connector, insertion positions of the individual parts having the optical fiber cord 201 inserted there through must be exactly determined. However, when a large number of parts are inserted to a flexible object, such as optical fiber cord 201, it is very difficult to mechanically recognize the positions of the inserting parts, which has impeded automation of the assembly. Further, in manual assembly, a large number of parts must be handled, requiring tedious work. In particular, in a field assembly of an optical fiber connector to a LAN optical fiber cord in an intelligent building using optical fiber cord 201 as a communication medium, the number of parts handled in the field is increased, and the construction time is considerably increased.

Furthermore, in the core adjusting step, two positioning steps i.e., the first rotational positioning and the second rotational positioning have been required, making it difficult to automate the assembly work.

SUMMARY OF THE INVENTION

To eliminate the above prior art defects, a primary object of the present invention is to provide an optical fiber connector unit which facilitates construction using an automatic assembly line and enables easy manual assembly.

Another object of the present invention is to provide an optical fiber connector which facilitates construction using an automatic assembly line and enables an easy manual assembly.

A further object of the present invention is to provide an optical fiber connector which can eliminate rotational adjustments of the stopring to simplify rotational positioning in the core adjusting step of the SC-type connector, noting that the first rotational positioning is essential for the core adjustment, but the second rotational positioning of the stopring is required due to the structure.

According to a first aspect of the present invention, there is provided an optical fiber connector unit comprising:

a ferrule having a rear end, a front end, and a through hole for holding an optical fiber strand inserted from the rear end along a central axis of the ferrule, the ferrule including a first flange formed to have a greater diameter than other portions and having an end facing the rear end, and a second flange provided at a rear end side of the first flange and having a second flange end face opposing the first flange end face;

a stopring as a cylindrical member provided outside of a part of the ferrule, having its inner peripheral surface a first step having a first end face opposing the first flange end face of the ferrule and a second step having a second end face opposing the second flange end face of the ferrule;

a coil spring having one end contacting with the first flange end face of the ferrule and an other end contacting with the first end face of the stopring, exerting a spring force on the ferrule in an axial direction so as to a tip of the ferrule towards outside from the stopring; and a locating member provided between the stopring and the ferrule, having a first stopper contacting with the second end face of the stopring, and a second stopper contacting with the second flange end face, the second stopper allowing passing of the second flange of the ferrule in a direction against the spring force of the coil spring but limiting passing of the second flange in the direction of the spring force, the locating member limiting relative movement of the stopring and the ferrule in a direction in which the spring force of the coil spring is applied, pressed and mounted to the stopring or the ferrule by elastic deformation of one of the first stopper and the second stopper.

Here, the first stopper of the locating member may comprise a cylindrical portion with a portion cut out or otherwise removed parallel to the axial direction, the second stopper may comprise a plurality of nibs projecting inclining towards inside in the radial direction from the cylindrical portion along a direction towards the rear end of the ferrule and capable of elastic deformation for allowing the second flange of the ferrule to pass in a direction reverse to the spring force.

The locating member may be pressed on an inner peripheral surface of the stopring by elastic deformation of the cylindrical portion.

The nibs of the locating member may be formed on the cylindrical portion by cutting out halfway the cylindrical portion.

The nibs of the locating member may be formed projecting from one end of the cylindrical portion.

The second stopper of the locating member may comprise a cylindrical portion with a portion cut out parallel to the axial direction and capable of elastic deformation for allowing the second flange of the ferrule to pass in a direction reverse to the spring force, and the first stopper may comprise a plurality of nibs projecting inclining towards outside in the radial direction from the cylindrical portion along a direction towards the front end of the ferrule.

The locating member may be pressed on an inner peripheral surface of the stopring by elastic deformation of the nibs.

The locating member may be pressed on an outer peripheral surface of the ferrule by elastic deformation of the cylindrical portion.

According to a second aspect of the present invention, there is provided an optical fiber connector comprising:

an optical fiber connector unit, having:

a ferrule having a rear end, a front end, and a through hole for holding an optical fiber strand inserted from the rear end along a central axis of the ferrule, the ferrule including a first flange formed to have a greater diameter than other portions and having an end face facing the rear end, and a second flange provided at a rear end side of the first flange and having a second flange end face opposing the first flange end face;

a stopring as a cylindrical member provided outside of a part of the ferrule, having its inner peripheral surface a first step having a first end face opposing the first flange end face of the ferrule and a second step having a second end face opposing the second flange end face of the ferrule;

a coil spring having one end contacting with the first flange end face of the ferrule and an other end contacting with the first end face of the stopring, exerting a spring force on the ferrule in an axial direction so as to a tip of the ferrule towards outside from the stopring; and a locating member provided between the stopring and the ferrule, having a first stopper contacting with the second end face of the stopring, and a second stopper contacting with the second flange end face, the second stopper allowing passing of the second flange of the ferrule in a direction against the spring force of the coil spring but limiting passing of the second flange in the direction of the spring force, the locating member limiting relative movement of the stopring and the ferrule in a direction in which the spring force of the coil spring is applied, pressed and mounted to the stopring or the ferrule by elastic deformation of one of the first stopper and the second stopper;

an optical fiber cord having an optical fiber mounted to the ferrule;

a crimp ring for bonding a tension member of the optical fiber cord to a rear end of the stopring;

a boot for covering the crimp ring bonded to the rear end of the stopring; and a plug frame engaging with an outer periphery of the stopring.

According to a third aspect of the present invention, there is provided an optical fiber connector comprising:

a ferrule having a through hold for holding an optical fiber inserted from a rear end along a central axis;

an optical fiber cord having an optical fiber mounted to the ferrule;

a stopring as a cylindrical member provided outside a part of the ferrule in a floating condition through a coil spring, and having a flange-formed projection on an outer peripheral surface thereof; and a plug frame having an opening engaging with the outer peripheral surface of the stopring by elastic deformation in a radial direction by insertion of the stopring in an axial direction and a protrusion projecting from an inner peripheral surface of the opening to inside in a radial direction for engaging with the projection of the stopring to prevent the stopring from passing to an opening end side, and having a relation of $D_2 \geq d_1 > D_1$ where $D_1$ being a diameter of a circle including the inner peripheral surface of the protrusion, $D_2$ being a diameter of a circle including the inner peripheral surface other than the protrusion, and $d_1$ being a diameter of a circle including a tip of the projection of the stopring.

Here, the opening of the plug frame may be formed to be capable of elastic deformation by a pair of cutouts, and the protrusion may be separated by the cutouts.

The projection of the stopring may be formed over the entire peripheral direction.

The projection of the stopring may be separated into a plurality of pieces by cutouts disposed over a peripheral direction, and an inside end face of the protrusion of the plug frame may have at least one stopper projecting inside in an axial direction, having a width in its peripheral direction of smaller than the width of the cutout of the stopring, and engaging with the cutout for limiting rotation in a peripheral direction of the stopring engaged with the plug frame.

An outer peripheral surface of the projection of the stopring may be provided with a serration comprising a plurality of grooves formed parallel to an axial direction, and an inner peripheral surface of the plug frame may be provided with a stopper formed parallel to an axial direction on a portion of the plug frame other than the portion in the peripheral direction where the protrusion is formed and engaging with the serration for limiting rotation in a peripheral direction of the stopring engaged with the plug frame.

The stopring may have on its outer periphery a second projection engaging with an opening end of an opening of the plug frame, and an outer peripheral surface of the second projection may be provided with a serration comprising a plurality of grooves engaging with the stopper of the stopring.

An optical fiber connector may further comprise:

a crimp ring for mounting the tension member of the optical fiber cord at a rear end of the stopring; and a boot for covering the crimp ring mounted to the rear end of the stopring.

The ferrule may have over an axial direction a first flange formed to have a greater diameter than other portions and having a first flange end face facing a rear end, and a second flange provided at the rear end side than the first flange and having a second flange end face opposing the first flange end face;

the stopring has a first step having on its inner peripheral surface a first end face opposing the first flange end face of the ferrule and a second step having a second end face opposing the second flange end face of the ferrule;

the coil spring has one end contacting with the first flange end face of the ferrule and the other end contacting with the first end face of the stopring, its tip exerting a spring force along an axial direction towards outside from the stopring on the ferrule; and the stopring and the ferrule are preassembled with a locating member provided between the two components, the locating member having a first stopper contacting the second end face of the stopring and a second stopper contacting with the second flange end face, the second stopper allowing passing of the second flange of the ferrule in a direction against the spring force of the coil spring of the second flange but limiting passing of the second flange in the direction of the spring force, the locating member limiting relative movement of the stopring and the ferrule in a direction in which the spring force of the coil spring is applied, the locating member being pressed and mounted to the stopring or the ferrule by elastic deformation of either the first stopper or the second stopper.

An optical fiber connector may further comprise a coupling device engaged with an outer periphery of the plug frame.

In the optical fiber connector unit of the present invention having the above construction, since its second flange of the ferrule contacts against a locating member, and the ferrule is regulated to move in a direction in which the spring force of the spring is applied, the ferrule can be integrated with the stopring and the spring even before assembling an optical fiber connector.

Furthermore, in the optical fiber connector having the optical fiber unit, since the ferrule contacts with another ferrule when an optical fiber cord is connected to the plug unit, and the ferrule can be moved against the spring force of the spring in the opposite direction to the spring force direction, the ferrule is kept in a floating condition to the stopring.

With the optical fiber connector having the spring and the plug frame of the above construction, the stopring can be inserted into the plug frame independent of its positional condition and, after the insertion, its projection contacts against the protrusion of the plug frame to prevent disconnection.

Further, with the optical fiber connector provided with a stopper on the plug frame, the stopper of the plug frame engages with the cutout of the projection or a stopping groove of the stopring to prevent rotation in the peripheral direction.

The above and other objects, effects, features and advantages of the present invention will become more apparent from the following description of embodiments thereof taken in conjunction with the accompanying drawings.

BRIEF DESCRIPTION OF THE DRAWINGS

FIG. 4A is a schematic longitudinal sectional view showing the plug frame of the SC-type connector;

FIG. 4B is a schematic cross sectional view taken along line B—B in FIG. 4A;

FIG. 4C is a schematic front view of FIG. 4A;

FIG. 4D is a schematic left side view of FIG. 4A;

FIG. 4E is a schematic right side view of FIG. 4A;

FIG. 16A is a schematic cross sectional view showing an assembly process of the optical fiber connector of FIG. 15;

FIG. 16B is a schematic cross sectional view showing the assembly process of the optical fiber connector of FIG. 15;

FIG. 16C is a schematic cross sectional view showing the assembly process of the optical fiber connector of FIG. 15;

FIG. 21A is a schematic front view showing an optical fiber connector unit using a stopring in a fifth embodiment of the present invention;

FIG. 21B is a schematic left side view of FIG. 21A;

FIG. 21C is a schematic longitudinal sectional view of a plug frame of the fifth embodiment;

FIG. 21D is a schematic right side view of FIG. 21C; and

FIG. 21E is a partly cutaway schematic cross sectional view showing an optical fiber connector of the fifth embodiment.

DETAILED DESCRIPTION OF THE PREFERRED EMBODIMENTS

Hereinafter, the present invention will be described in more detailed by embodiments. However, the present invention should not be construed as being limited thereto.

Figure 8:
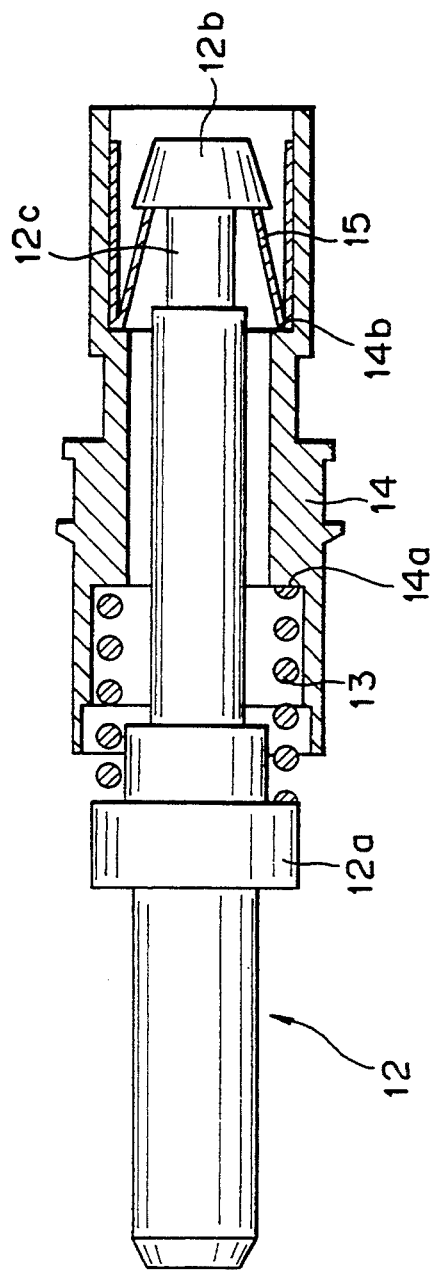
FIG. 8 is a schematic Longitudinal sectional view showing the optical fiber connector unit according to a first embodiment of the present invention.

FIG. 8 is a schematic longitudinal sectional view showing an optical fiber connector unit according to a first embodiment of the present invention. This unit comprises a ferrule 12, a spring 13, a stopring 14 and a locating member 15. As shown in FIG. 8, ferrule 12, which is typically made of a ceramic, has a rear end, a front end, and a through hole for holding an optical fiber strand (not shown) of an optical fiber cord. The optical fiber cord is inserted from the rear end along a central axis of the ferrule. Ferrule 12 is provided at two positions in the axial direction with first and second flanges 12a and 12b, each being formed to have greater diameters than other portions.

Stopring 14, typically made of metal such as bronze, is a cylindrical member having a step 14a on its inner peripheral surface. A tension member of the optical fiber cord is connected to stopring 14 in a connected condition.

Spring 13 has one end contacting with an end face of first flange 12a, and another end contacting with an end face of step 14a. Spring 13 exerts a spring force towards the outside (to the left in the figure) of stopring 14 in the axial direction of ferrule 12.

The locating member 15, which will be described later in detail, is mounted on the inner peripheral surface of stopring 14, and is adapted so that its tip contacts with an end face of second flange 12b. Locating member 15 limits movement of ferrule 12 in a direction of the spring force of spring 13 (to the left in the figure), and allows movement of ferrule 12 in the reverse direction (to the right in the figure).

In ferrule 12 of the present-embodiment, a small diameter portion 12c is adjacent to second flange 12b. Small diameter portion 12c has a diameter smaller than the inner diameter at the tip of the locating member 15. Furthermore, second flange 12b has a tapered surface gradually decreasing in diameter towards a direction (right in the figure) reverse to the direction in which the spring force of spring 13 is applied.

Figure 9:
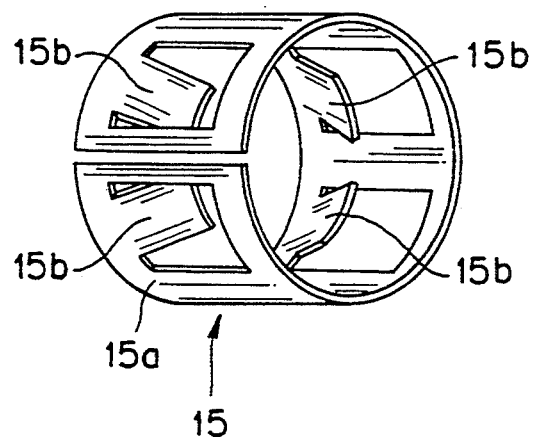
FIG. 9 is a schematic perspective view showing a locating member in the first embodiment.

FIG. 9 is a schematic perspective view showing locating member 15 of the present embodiment. As shown in FIG. 9, locating member 15, typically formed of an elastic material such as phosphor bronze, has stoppers comprising a cylindrical portion 15a in which a portion of the cylinder is cut out or slit parallel to the axial direction, and a plurality (four in the figure) of nibs 15b which project inclining in a direction (right direction in the figure) reverse to the direction in which the spring force of spring 13 is applied and towards the center of stopring 14. Nibs 15b allow the second flange 12b to pass in only one direction. Thus, locating member 15 is mounted on the inner peripheral surface of stopring 14 due to elastic deformation of cylindrical portion 15a, and a tip of nibs 15b contacts with the end face of second flange 12b of the ferrule 12.

In the above embodiment, in a condition before connection as shown in FIG. 8, both end faces of the spring 13 are compressively deformed by stopring 14 and ferrule 12 to generate a pressure. As a result, since a pressure due to a repulsive force of spring 13 is applied to the tip of locating member 15, relative positions of the individual parts are exactly determined. The parts assembled as in FIG. 8 are hereinafter referred to as an optical fiber connector unit.

Figure 10:
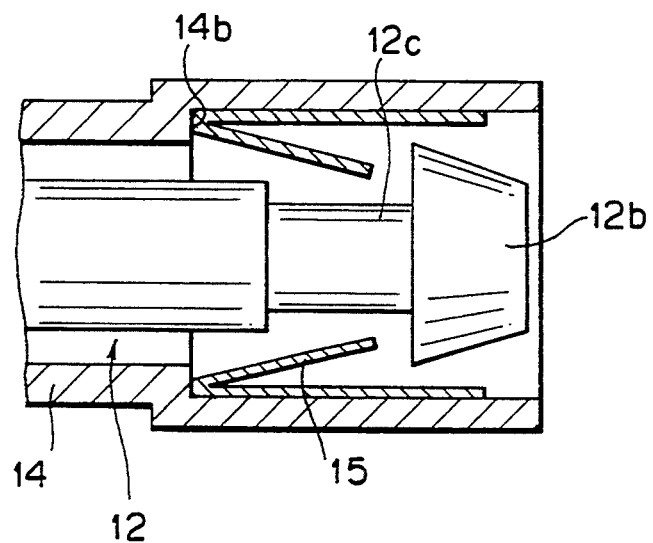
FIG. 10 is a schematic longitudinal sectional view showing an end of a connected ferrule in the first embodiment shown in FIG. 8.

When the optical fiber connector unit is mounted on the plug frame, since spring 13 is further compressed to increase deformation, the second flange 12b is separated from locating member 15 as shown in FIG. 10 so that the inner peripheral surface of locating member 15 opposes small diameter portion 12c. Therefore, ferrule 12 is released from a binding condition of locating member 15, thus achieving a floating condition which is the feature of the SC-type connector. Under this condition, even when the stopring 14 is dislocated by an external force, no external force will be transmitted to ferrule 12 through locating member 15, and stopring 14 and ferrule 12 will contact each other only through spring 13, thereby maintaining a flexible condition.

Figure 11:
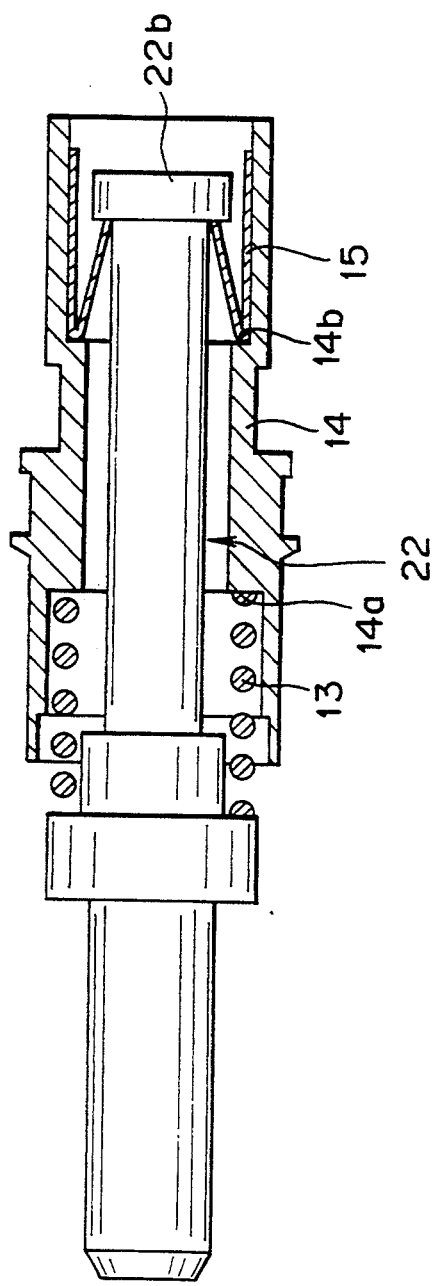
FIG. 11 is a schematic cross sectional view showing an optical fiber connector unit according to a second embodiment of the present invention.

FIG. 11 is a schematic cross sectional view showing a second embodiment of the optical fiber connector unit. The second embodiment differs from the first embodiment in that the portion adjacent to a second flange 22b of a ferrule 22 differs in shape. That is, the ferrule does not include the small diameter portion 12c in the first embodiment.

Figure 12:
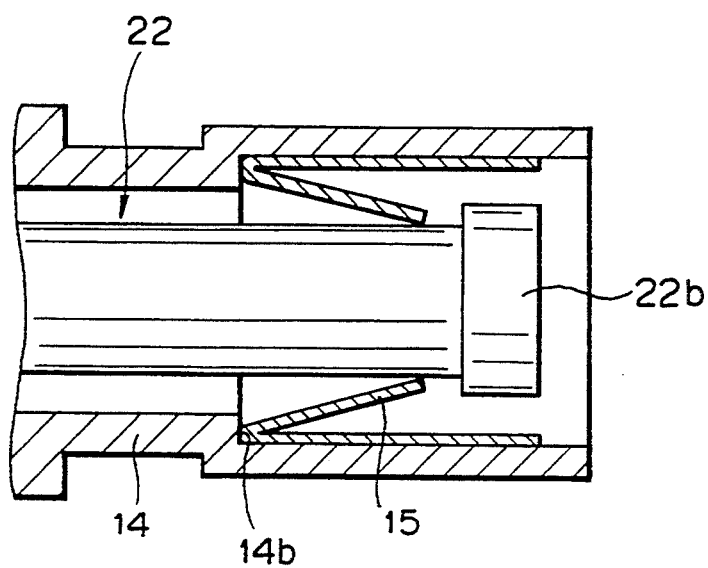
FIG. 12 is a schematic longitudinal view showing an end of the connected ferrule in the second embodiment shown in FIG. 11.

FIG. 12 is a schematic view showing relative positions of stopring 14 and second flange 22b of ferrule 22 after normal assembly of the second embodiment.

In the second embodiment, unlike the first embodiment, even though contact is released between locating member 15 and ferrule 22 in the final assembly condition, ferrule 22 is always in contact with locating member 15. Stopring 14 and ferrule 22 do not become non-contacting, i.e., they do not make a floating structure in the strict sense. However, even with such an arrangement, if nibs 15b of the locating member are formed with a small thickness, it is possible to set a spring constant of nibs 15b to a sufficiently small value compared to that of spring 13. That is, in the optical fiber connector unit of the second embodiment, the binding force which locating member 15 exerts on ferrule 22 when stopring 14 is dislocated can be made sufficiently small compared to the binding force of spring 13 on ferrule 22, thus achieving a substantially floating mechanism.

In the second embodiment, where locating member 15 is always in contact with stopring 14 and ferrule 22, the ferrule can be more easily machined compared to the first embodiment, and a reduction in the cost of parts is possible. Further, since locating member 15 contacts and presses the outer peripheral surface of ferrule 22 in a radial direction, ferrule 22 is held at the center of stopring 14. Therefore, it is easy to achieve automation of subsequent assembly work.

The above two embodiments use locating member 15, but they are not limited to this structure. Any structure may be used in which the locating member contacts with the second flange of the ferrule to limit movement of the ferrules in the axial direction due to the spring force of the spring 13, but which allow movement in the direction reverse to the spring force direction.

Figure 13A:
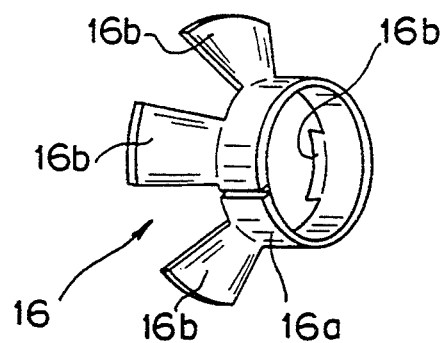
FIG. 13A is a schematic perspective view showing a locating member in another embodiment of the present invention.
Figure 14A:
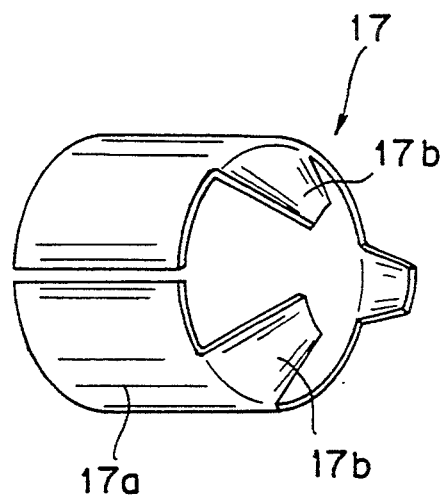
FIG. 14A is a schematic perspective view showing a locating member in another embodiment of the present invention.

For example, the locating member is not limited to the one which is shown in FIG. 9, but may be, for example, one which is shown in FIG. 13A or 14A.

Figure 13B:
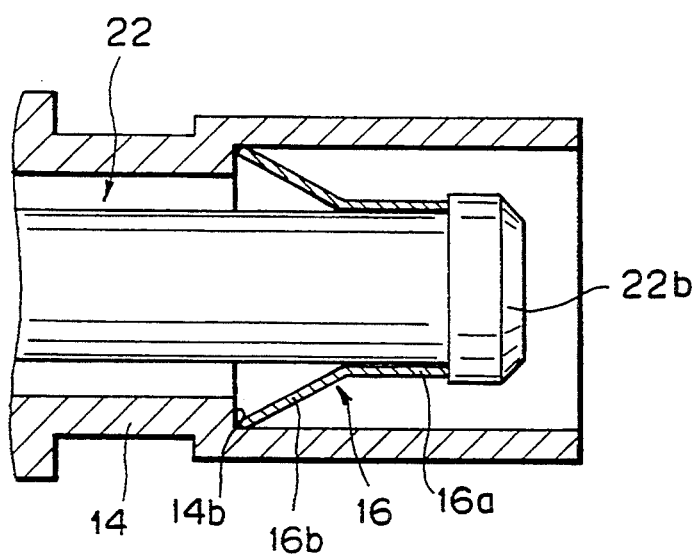
FIG. 13B is a schematic cross sectional view showing an incorporated locating member of FIG. 13A.

FIG. 13A is a schematic perspective view showing a locating member in another embodiment of the present invention, and FIG. 13B is a schematic cross sectional view showing the incorporated locating member of FIG. 13A. As shown in FIG. 13A, a locating member 16 comprises a cylindrical portion 16a which is formed by cutting out a portion of a cylinder parallel to the axial direction so that the locating member elastically deforms to allow second flange 22b of ferrule 22 to pass. The locating member also has a plurality (four in the figure) of nibs 16b integrally projecting from the cylindrical portion 16a towards the inner peripheral surface of stopring 14. As shown in FIG. 13B, locating member 16 is mounted on the outer peripheral surface of ferrule 22 and, due to elastic deformation of nibs 16b, cylindrical portion 16a contacts against the end face of second flange 22b. The outer diameter of the tip of nibs 16b is nearly the same as the inner diameter of stopring 14 so that ferrule 22 is positioned at nearly the center of stopring 14, while maintaining the substantially floating mechanism. Of course, locating member 16 can also be used for the above-described ferrule 12 as well.

Figure 14B:
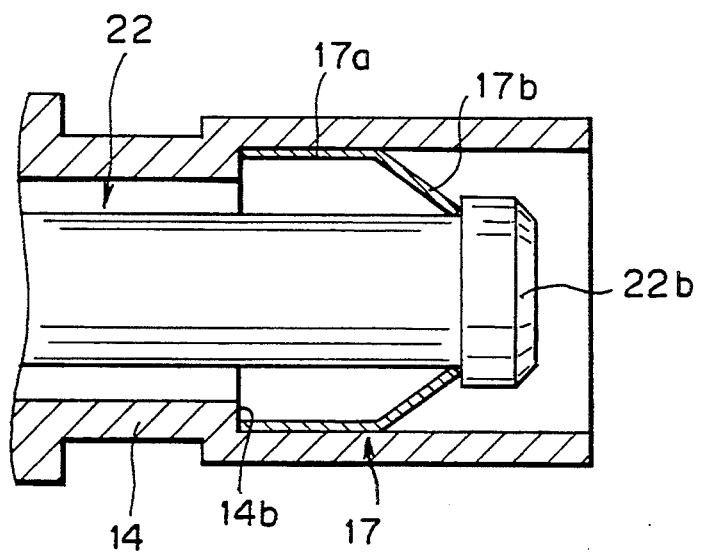
FIG. 14B is a schematic cross sectional view showing the incorporated locating member FIG. 14A.

FIG. 14A is a schematic perspective view showing a locating member in another embodiment of the present invention, and FIG. 14B is a schematic cross sectional view showing the incorporated locating member of FIG. 14A. A locating member 17 shown in FIG. 14A comprises a cylindrical portion 17a which is formed by cutting out a portion of a cylinder parallel to the axial direction, and a plurality (three in the figure) of nibs 17b provided at an end of cylindrical portion 17a and projecting inward in the radial direction and to the right in the figure. As shown in FIG. 14B, nibs 17b allow flange 22b to pass in one direction but limit passing of flange 22b once passed in the reverse direction. Further, the inner diameter of the tips of nibs 17b are nearly the same as the diameter of the outer peripheral surface of ferrule 22. Thus, nibs 17b position ferrule 22 at nearly the center of stopring 14, while maintaining the substantially floating mechanism. Of course, locating member 17 can also be used for the above-described ferrule 12 as well.

Figure 15:
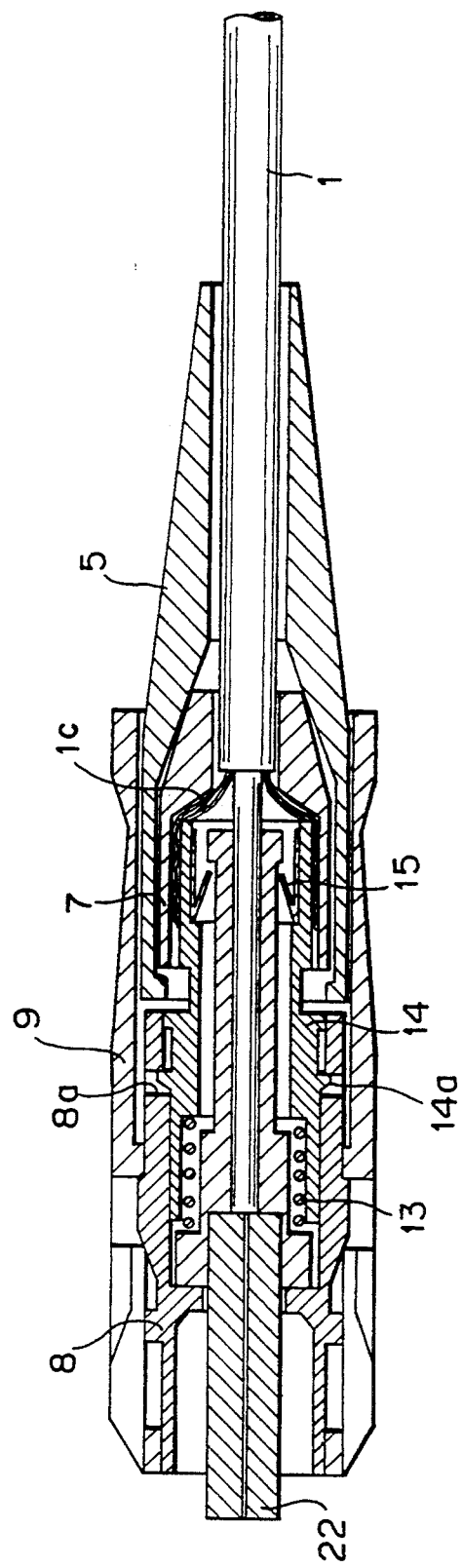
FIG. 15 is a schematic longitudinal sectional view showing the optical fiber connector using the connector unit of FIG. 11.

FIG. 15 is a schematic cross sectional view showing an optical fiber connector incorporating the optical fiber connector unit according to the second embodiment, and FIGS. 16A to 16C are schematic cross sectional view showing the assembly process of the optical fiber connector of FIG. 15. An assembly process of the optical fiber connector will be described with reference to FIGS. 16A to 16C.

First, as shown in FIG. 16A, a tip of the optical fiber cord 1 is inserted through a boot 5, and a crimp ring 7. Optical fiber cord 1 is pretreated by sheath removing, jacket removing, primary coat removing, and the like to expose an optical fiber 1a, an optical fiber strand 1b, and a tension member 1c. Then, optical fiber cord 1 is bonded to ferrule 22 of the optical fiber connector.

Figure 1A:
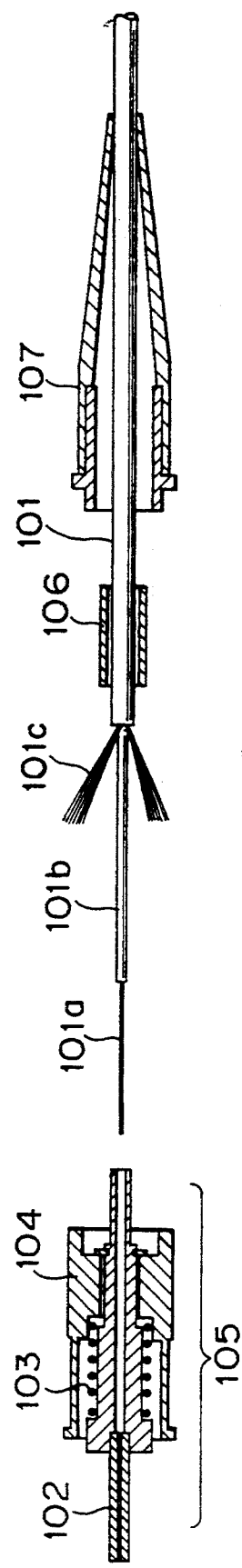
FIGS. 1A to 1C are schematic views showing the structure and the assembly of the ST-type connector, respectively.
Figure 1B:
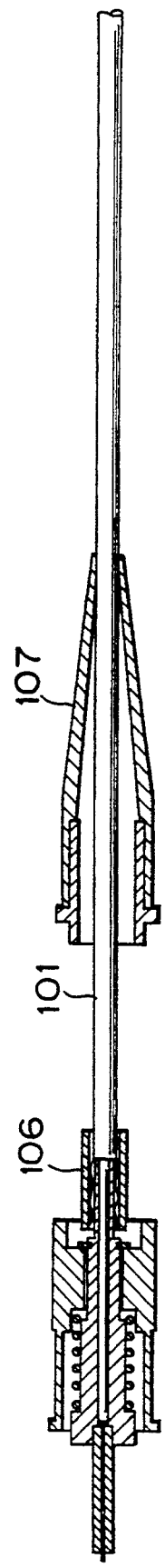
Figure 1C:
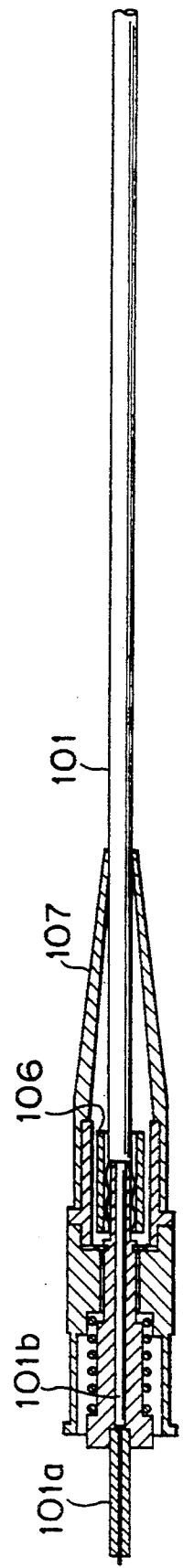
Figures 2A, 2B:
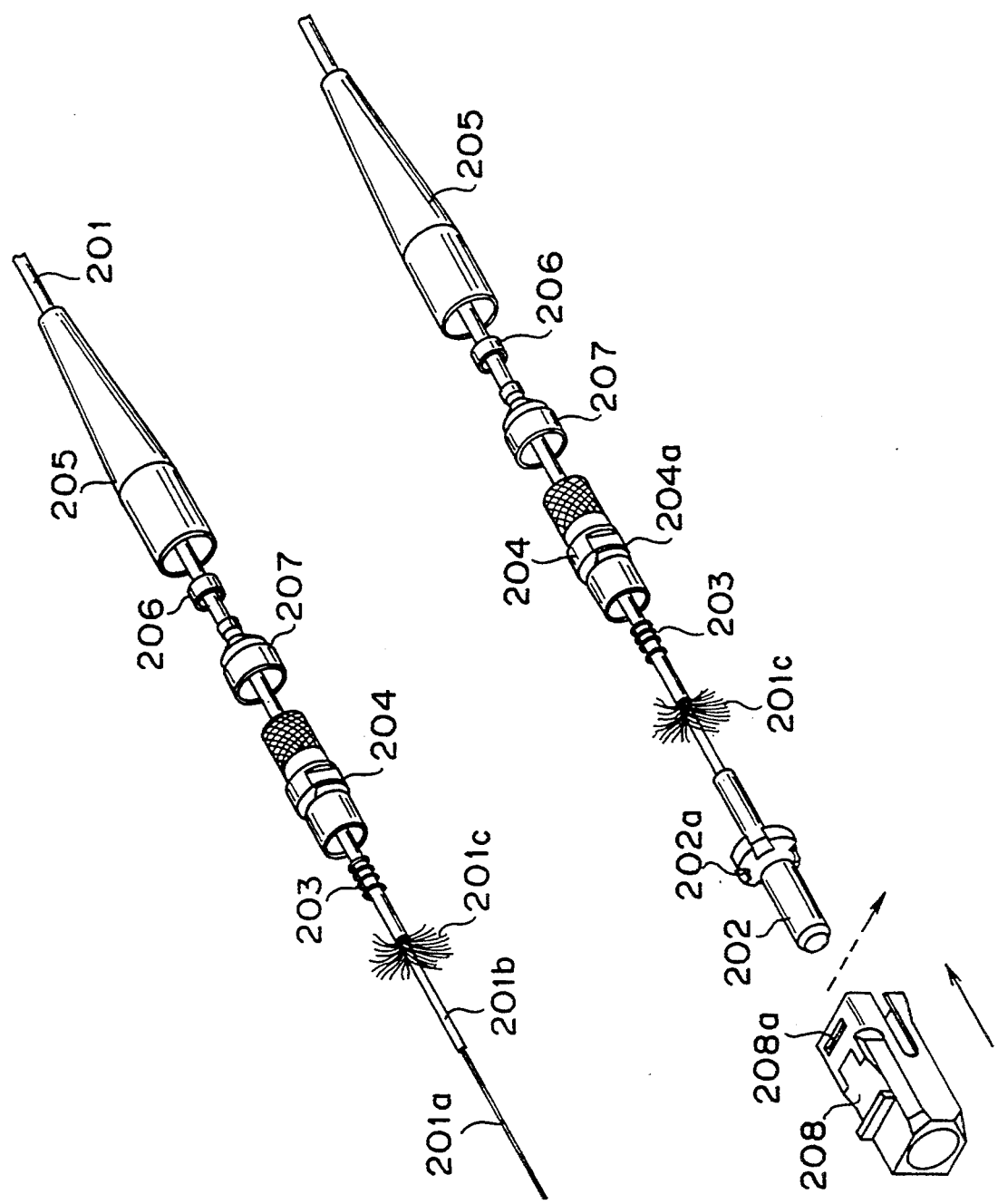
FIGS. 2A to 2D are schematic views showing the structure and the assembly of the SC-type connector, respectively.
Figure 2C:
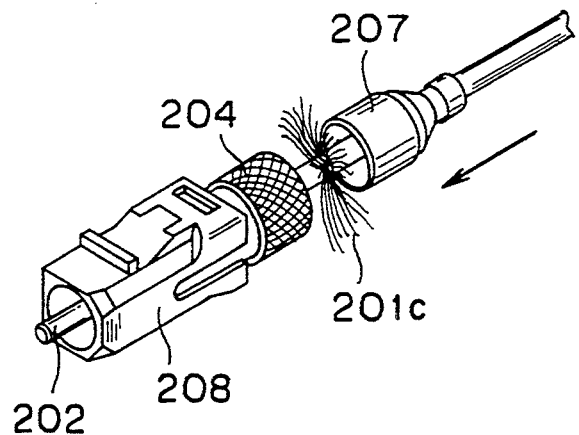
Figure 2D:
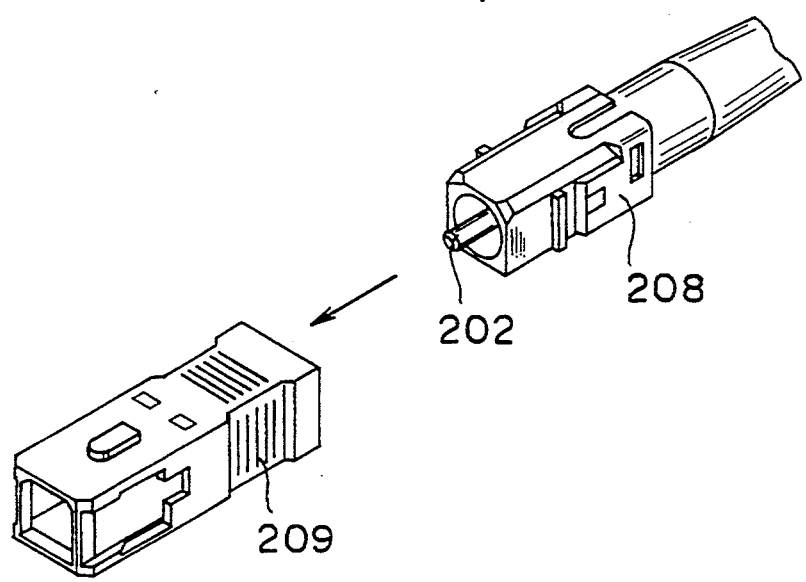
Figures 3A, 3B:
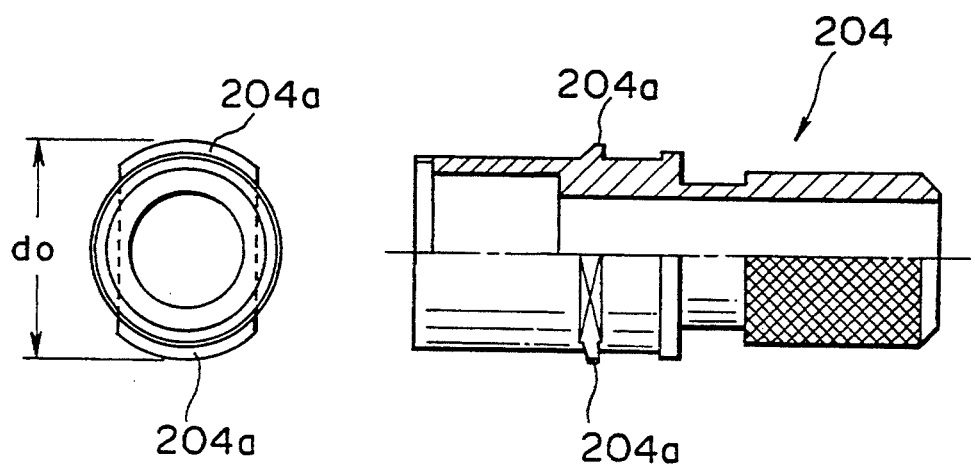
FIG. 3A is a partly cutaway schematic front view showing the stopring of the SC-type connector.
FIG. 3B is a schematic left side view of FIG. 3A.
Figures 5A, 5B:
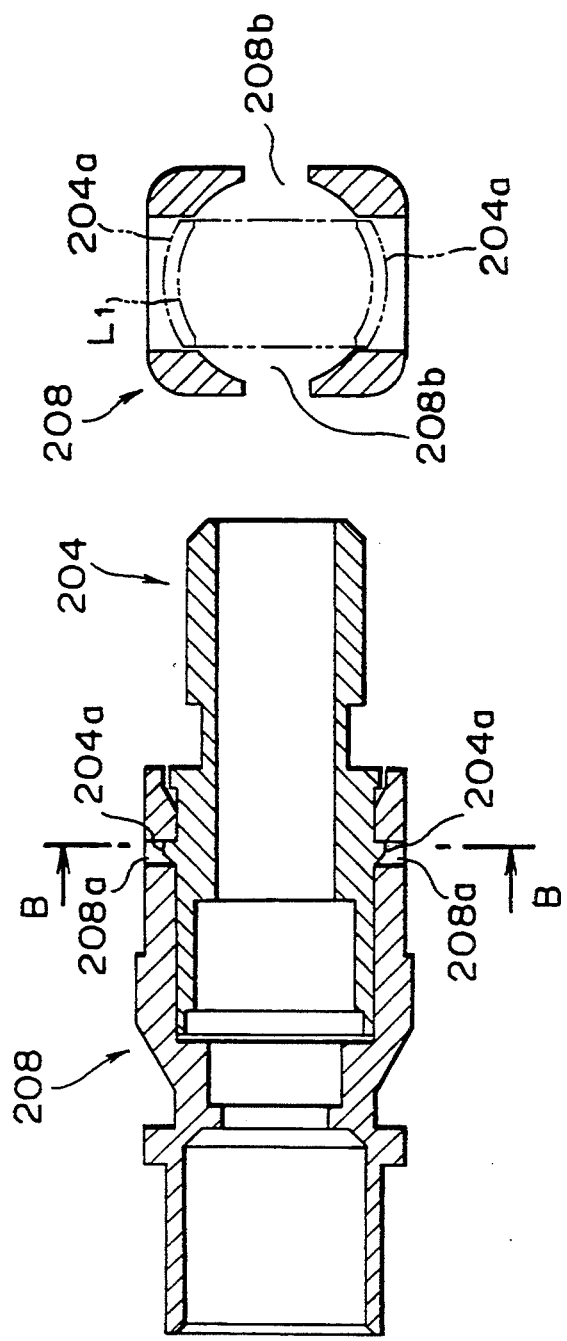
FIG. 5A is a schematic longitudinal sectional view showing part of the connected SC-type connector.
FIG. 5B is a schematic cross sectional view taken along line B—B of FIG. 5A, showing the position of the protrusion by phantom lines (chain double-dashed line) $L_1$ in FIG. 4B.
Figure 6A:
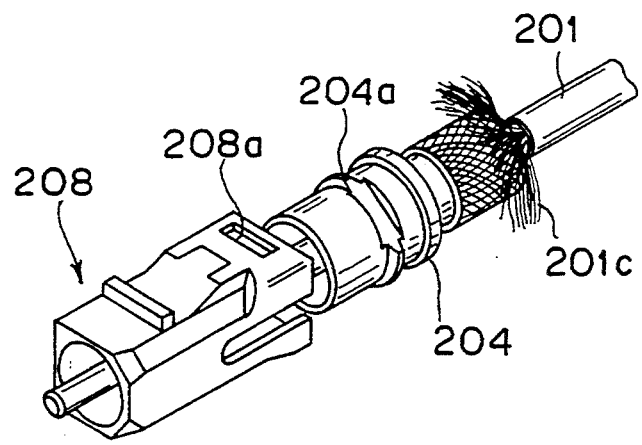
FIG. 6A is a schematic perspective view showing the connected SC-type connector, particularly showing parts of the stopring and the plug frame.
Figure 6B:
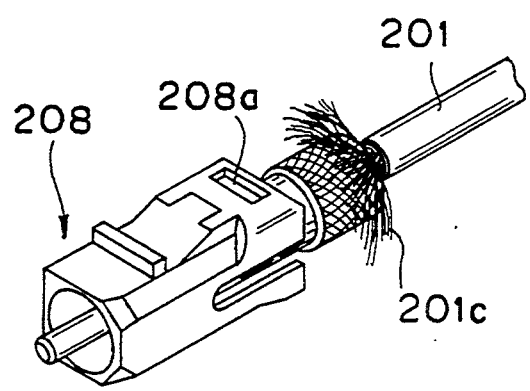
FIG. 6B is a schematic perspective view showing the connected SC-type connector, particularly showing parts of the stopring and the plug frame.
Figure 7:
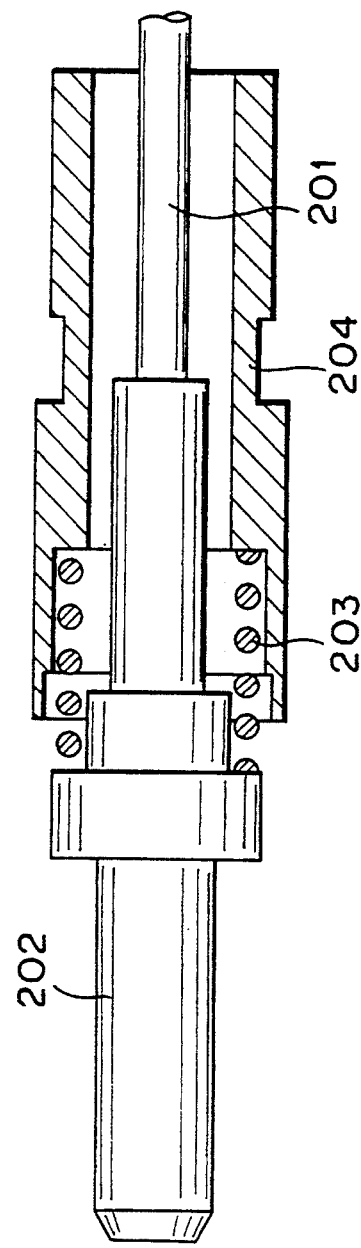
FIG. 7 is a schematic cross sectional view showing relative positions of parts in a virtual assembly condition of FIG. 6A.

Then, after the tip of ferrule 22 is polished to a convex-curved surface, a plug frame 8 is mounted to ferrule 22 as shown in FIG. 16B. In this mounting, as described in the section of Prior Art (FIG. 2), while performing core-eccentricity adjusting of the ferrule, a projection 14a of a stopring 14 is engaged with a hole 8a of the plug frame 8, and both components are retained in a floating condition.

Finally, tension member 1c is pinched between the rear end of stopring 14 and crimp ring 7, crimp ring 7 is crimped, and boot 5 is provided. Then, a coupling device 9 is mounted to complete the optical fiber connector shown in FIG. 15.

In the above-described embodiments, the locating member is elasticity mounted on the inner peripheral surface of the stopring and abuts with the flange of the ferrule. However, an alternative construction may be used in which the locating member is elasticity mounted on the outer peripheral surface of the ferrule and abuts the flange on the inner peripheral surface of the stopring. For example, locating member 16 of FIG. 13A is mounted to the ferrule 22 by elastic deformation of cylindrical portion 16a, and the tips of nibs 16b are abutted against the flange 14b of the stopring 14 to construct a stable optical fiber connector. In this case, if the diameter of the tips of the nibs 16b and the inner diameter of the stopring 14 are nearly the same, a positioning and floating mechanism of the ferrule can be assured.

As described above in detail with reference to the embodiment, since, in the optical fiber connector unit of the present invention, the stopring, the spring, and the ferrule are constructed to an integral structure having the locating member, parts can be easily controlled without losing the connection compatibility with conventional SC-type connectors. As a result, an automatic assembly line for optical fiber connectors can be easily constructed, thereby achieving a reliable optical fiber connector of stable quality and at a reduced cost. Further, in addition to the above effects, the assembly work can be simplified when the present embodiment is applied in manual assembly, particularly in a field assembly with a poor work environment.

Another embodiment of the optical fiber connector, which can simplify the core adjusting step in the assembly of the plug frame of the optical fiber connector, will be described below.

Figures 17A, 17B:
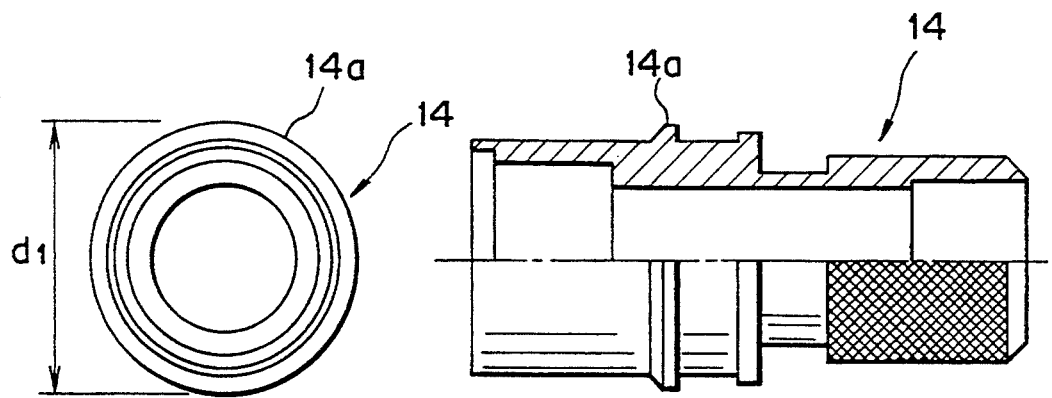
FIG. 17A is a partly cutaway schematic front view showing a stopring in a third embodiment according to the present invention.
FIG. 17B is a schematic left side view of FIG. 17A.
Figures 17C, 17D:
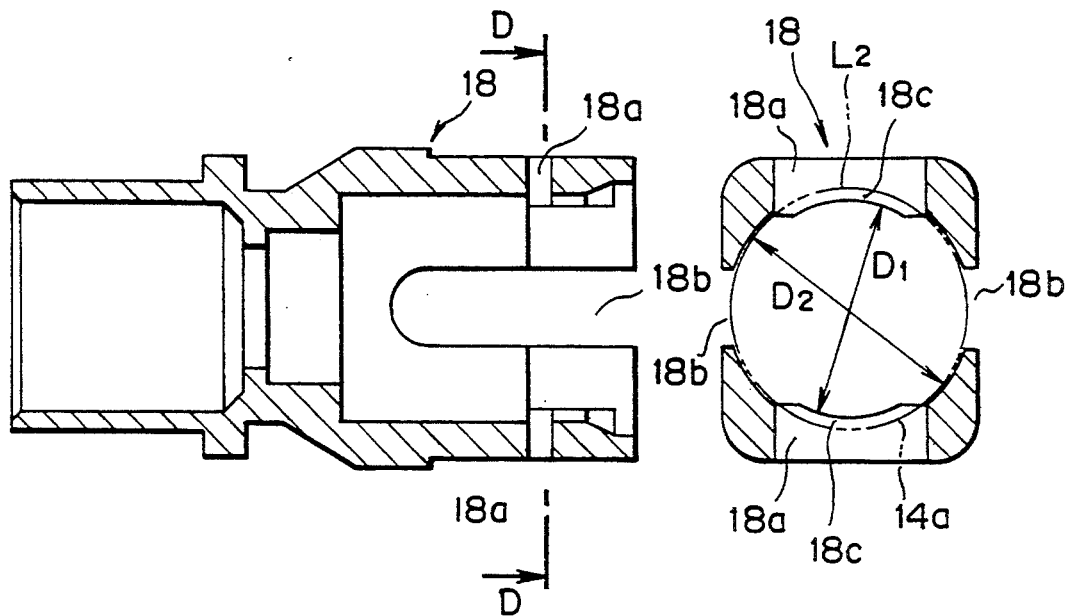
FIG. 17C is a schematic longitudinal view showing the plug frame.
FIG. 17D is a schematic cross sectional view taken along line D—D of FIG. 17C.

FIG. 17A is a partly cutaway schematic front view showing a stopring according to a third embodiment of the present invention. FIG. 17B is a left side view of the stopring, and FIG. 17C is a schematic longitudinal sectional view showing a plug frame. FIG. 17D is a schematic cross sectional view taken along line D—D of FIG. 17C.

As shown in FIGS. 17A and 17B, stopring 14, as in the prior art, is a cylindrical member for supporting the ferrule in a floating condition using a coil spring. The stopring has a flange-formed protrusion 14a over the entire circumference of the outer peripheral surface.

As shown in FIGS. 17C and 17D, the plug frame 18, made of a plastic such as polybutylene terephthalate (PBT), as in the prior art, has a pair of cutouts 18b extending in the axial direction, allowing the opening to be further opened by elastic deformation in the radial direction. Plug frame 18 is provided with a pair of protrusions 18c projecting in the radial direction for contacting with projection 14a of the inserted stopring 14. Protrusions 18c and projections 14a prevent stopring 14 from passing through plug frame 18 to the opening end side. The protrusions 18c are provided adjacent to hole 18a at the opening end side (formed as the hole 208a in the prior art). In this case, $D_2 > d\ d_1 > D_1$, wherein $D_1$ is a diameter of a circle defined by the inner peripheral surfaces of the protrusions 18c, $D_2$ is a diameter of a circle defined by the inner peripheral surface of the plug frame at a base of, and $d_1$ is an outer diameter of projection 14a of the stopring 14. That is, in a connected condition, the outer shape of projection 14a is as indicated by the phantom line (chain double-dashed line) $L_2$ in FIG. 17(d).

In the present embodiment, projection 14a of stopring 14 is provided over the entire circumference of the outer peripheral surface. With the opening of the plug frame opened, stopring 14 is inserted into plug frame 18 and, once projection 14a is inserted deeper than protrusions 18c, an external force is removed so that plug frame 18 is returned to the original position by its elasticity. In this state, projection 14a contacts with protrusions 18c, thereby maintaining connection of both components.

Insertion of the stopring 14 into plug frame 18 in the third embodiment can be carried out independent of the position of stopring 14 in the peripheral direction.

Therefore, the optical fiber connector using stopring 14 and plug frame 18 can simplify the assembly process without losing the connection compatibility of the prior art SC-type connector, enabling easy automatic assembly. Other parts of the optical fiber connector are essentially similar to those in the prior art, and description thereof is omitted. Needless to say, the ferrule, the spring, and the stopring may be made using the locating member of the above-described embodiments.

Next, in addition to the third embodiment, an example of a stopring and a plug frame is shown which can limit rotation in the peripheral direction of the stopring after engagement.

Figures 18A, 18B:
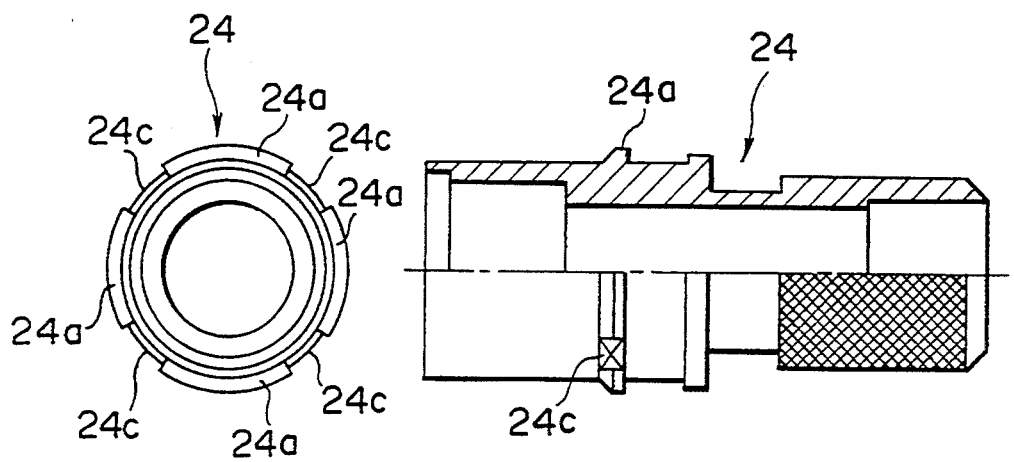
FIG. 18A is a partly cutaway schematic front view showing a stopring in a fourth embodiment according to the present invention.
FIG. 18B is a schematic left side view of FIG. 18A.
Figures 18C, 18D:
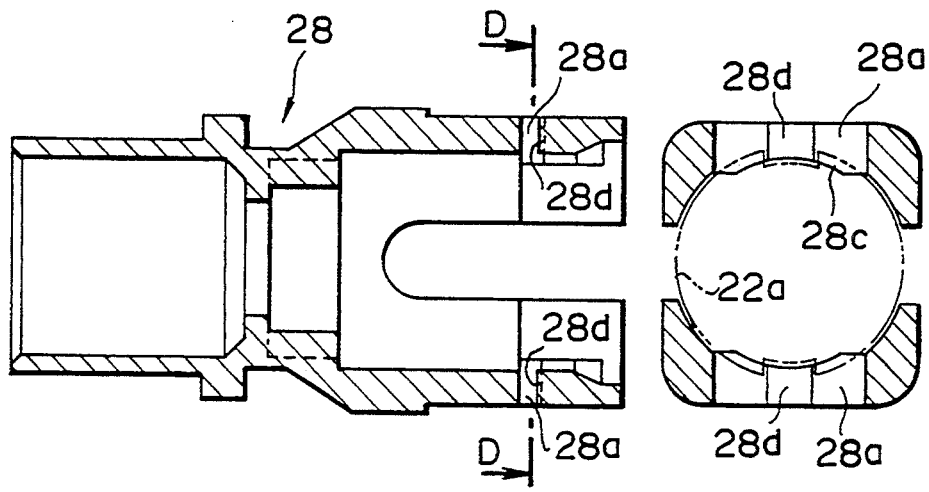
FIG. 18C is a schematic longitudinal view showing the plug frame (upper half only)
FIG. 18D is a schematic cross sectional view taken along line D—D of FIG. 18C.
Figure 18E:
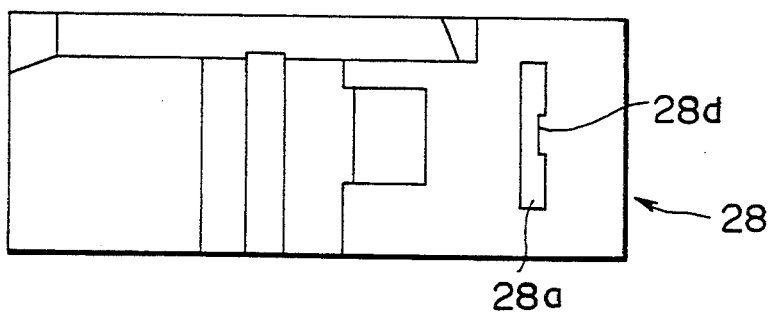
FIG. 18E is a schematic plan view of FIG. 18C.
Figure 19:
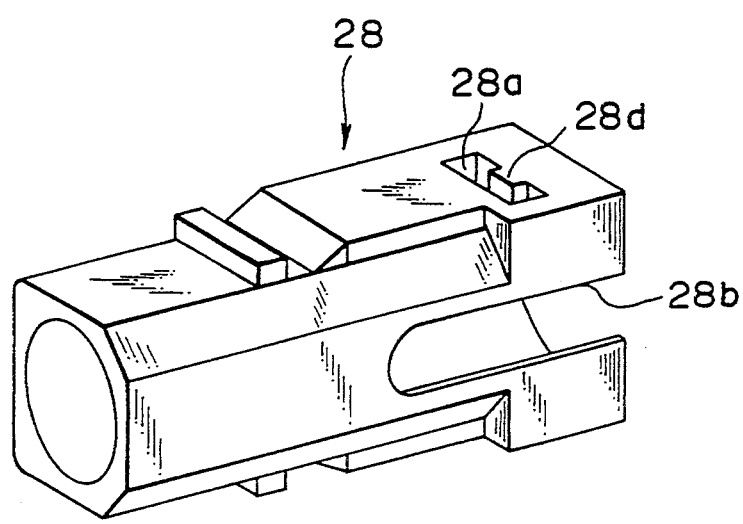
FIG. 19 is a schematic perspective view showing a plug frame of the fourth embodiment.
Figures 20A, 20B:
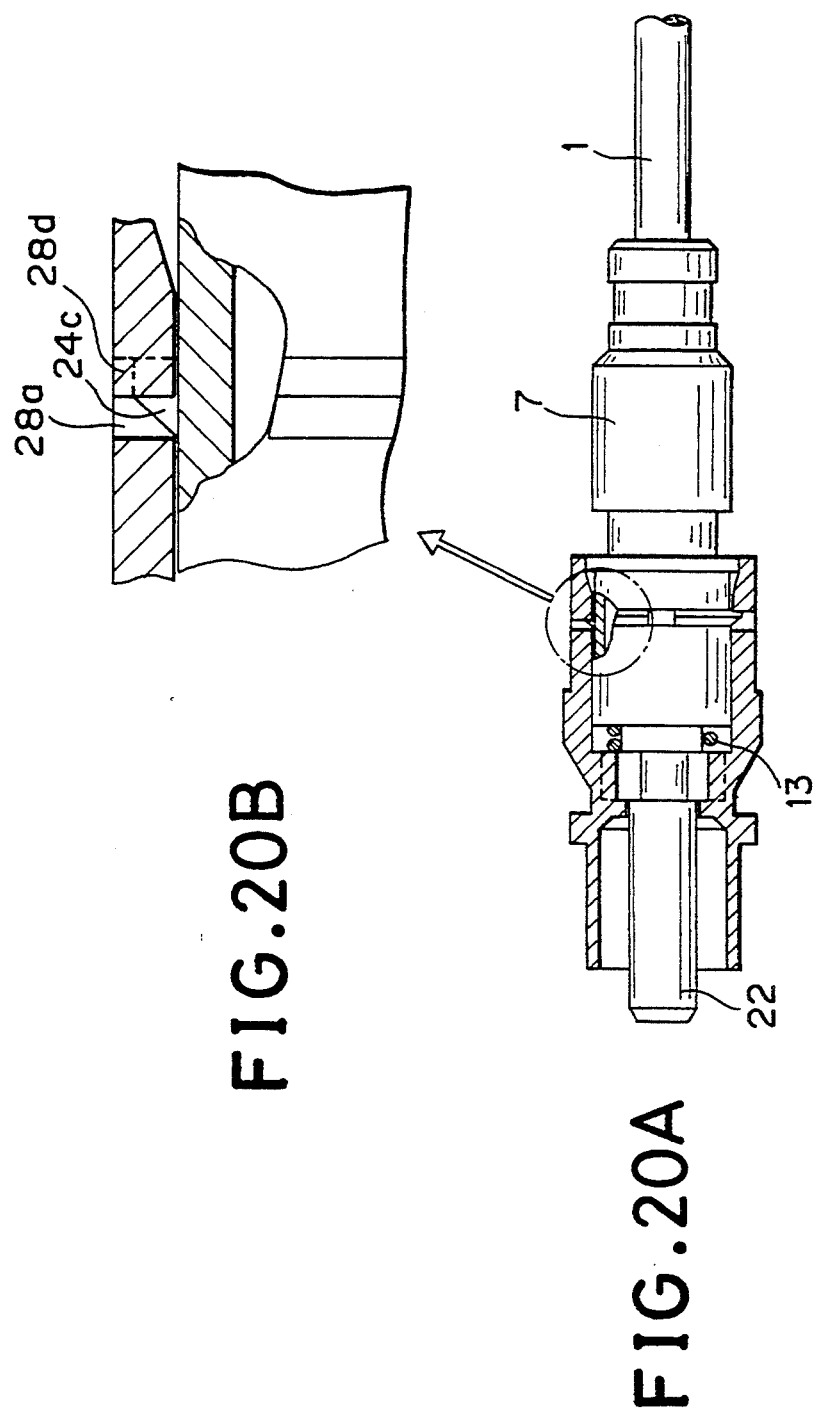
FIG. 20A is a schematic cross sectional view showing an optical fiber connector of the fourth embodiment.
FIG. 20B is a schematic enlarged view showing part of FIG. 20A.

FIG. 18A is a partly cutaway schematic front view of the stopring according to a fourth embodiment of the present invention. FIG. 18B is a schematic left side view, and FIG. 18C is a schematic longitudinal sectional view showing the plug frame according to the fourth embodiment of the present invention. FIG. 18D is a schematic cross sectional view taken along line D—D, and FIG. 18E is a schematic plan view. Further, FIG. 19 is a schematic perspective view showing the plug frame 28, and FIGS. 20A and 20B are schematic views showing engaging condition of plug frame 28 with stopring 24.

As shown in FIGS. 18A and 18B, a projection 24a of stopring 24 has a plurality (four in this embodiment) of cutouts 24c over the peripheral direction. Furthermore, as shown in FIGS. 18C, 18D, and 18E, holes 28a and protrusions 28c of plug frame 28 are provided. Stoppers 28d are provided which engage with cutouts 24c of the projection 24a, which contacts with the protrusion 28c. Stoppers 28d project in the axial direction to limit rotation in the peripheral direction of plug frame 28. In this case, the widths of protrusions 28c are formed greater than the widths of cutouts 24c. Other structures of the present embodiment are similar to the third embodiment.

The fourth embodiment, in addition to the third embodiment, has stoppers 28d engaging with cutouts 24c to limit rotation in the peripheral direction of stopring 24.

Insertion of stopring 24 into plug frame 28 in the fourth embodiment can be carried out independent of the position of stopring 24 in the peripheral direction. Once inserted, protrusions 28c and projection 24a may be in a contact condition, with cutouts 24c not engaged with stoppers 28d. With stopring 24 and the plug frame 28 in a connected condition, even if an external force is applied to stopring 24 to rotate it in the peripheral direction, rotation of the stopring 24 is limited at a position where cutouts 24c engage with stoppers 28d. Since stopring 24 supports the ferrule in a floating condition, the ferrule will never move.

Therefore, the optical fiber connector using stop 24 and plug frame 28 is easy to assemble automatically. Other parts of the optical fiber connector are essentially the same as in the prior art, and description thereof is omitted. Needless to say, the ferrule, the spring, and the stopring may be made in to the optical fiber connector unit using the locating member of the above-described embodiments.

In the present embodiment (FIG. 20), the optical fiber connector is constructed using ferrule 22, spring 13, and locating member 15 (not shown) of the above embodiment.

Referring to FIG. 21A–21E, another embodiment is shown, in which rotation in the peripheral direction of the stopring is limited. FIG. 21A is a schematic front view showing an optical fiber connector using stopring 34. FIG. 21B is a schematic left side view, and FIG. 21C is a schematic longitudinal sectional view showing a plug frame 38. FIG. 21D is a schematic right side view, and FIG. 21E is a partly cutaway schematic cross sectional view showing engaging condition of these components.

As shown in FIGS. 21A and 21B, outer peripheral surfaces of a projection 34a and a second projection 34d of a stopring 34 are provided with serrations 34e and 34f comprising parallel grooves along the insertion direction for stopping rotation. On the other hand, as shown in FIGS. 21C and 21D, the inner peripheral surface of the plug frame 38 is provided with rotation stoppers 38e for engaging with the serrations 34e and 34f. Stoppers 38e extend to the opening end at portions other than the portions having protrusions 38c of the above third embodiment. The maximum diameter of the serrations 34e is the above-described $d_1$. A diameter of the inner peripheral surface of stoppers 38e is the above-described $D_1$. The relation of these diameters with $D_2$ is the same as in the above third embodiment. Other constructions of the present embodiment is similar to the third embodiment. Furthermore, stopring 34 is integrated with ferrule 22, spring 13, and a locating member (not shown) to form an optical fiber connector.

The fifth embodiment, in addition to the third embodiment, has an effect that serrations 34e and 34f engage with stoppers 38e to limit rotation in the peripheral direction of stopring 34.

Insertion of stopring 34 into plug frame 38 in the fifth embodiment can be carried out independent of the position of stopring 34 in the peripheral direction. In this case, since stopring 34 supports the ferrule in a floating condition, the ferrule will never move.

As described above, since the optical fiber connector according to the third to fifth embodiments of the present invention can eliminate the need for the second positioning of the stopring and the plug frame in the assembly, the assembly is considerably simplified. As a result, construction of an automatic assembly line for the optical fiber connector is simplified, thereby achieving stable quality, reliability, and cost reduction of the optical fiber connector. Furthermore, in addition to the above effects, the assembly can be simplified for manual assembly, particularly in field assembly of the optical fiber connector. Furthermore, in the optical fiber connector of the fourth and fifth embodiments, rotation of the stopring after connection is prevented.

The present invention has been described in detail with respect to preferred embodiments, and it is contemplated that changes and modifications may be made without departing from the invention in its broader aspects. It is the intention, therefore, in the appended claims to cover all such changes and modifications as fall within the true spirit of the invention.

What is claimed is:

1. An optical fiber connector unit, comprising:
   (A) a ferrule having:
      (1) a rear end;
      (2) a front end, a through hole extending from the rear end to the front end along a central axis of said ferrule, said through hole being adapted for holding an optical fiber strand insertable from the rear end of said ferrule;
      (3) a first flange defining a portion of said ferrule having the largest diameter thereof, said first flange having a first flange end face facing the rear end of said ferrule; and
      (4) a second flange provided rearwardly relative to said first flange, said second flange having a second flange end face opposing the end face of the first flange;
   (B) a cylindrically shaped stopring surrounding a portion of said ferrule and having an inner peripheral surface, said inner peripheral surface comprising:
      (1) a first step having an end face opposing the end face of the first flange; and
      (2) a second step having an end face opposing the end face of the second flange;
   (C) a coil spring having a first end contacting the end face of the first flange, and a second end contacting the end face of the first step of the inner peripheral portion of said stopring, said coil spring exerting a spring force on said ferrule and said stopring so as to axially urge said ferrule in a direction away from said stopring; and
   (D) a locating member coaxially provided between said stopring and said ferrule and limiting relative movement of said stopring and said ferrule in a direction of the spring force, said locating member comprising:
      (1) a first stopper contacting the end face of the second step; and
      (2) a second stopper contacting the end face of the second flange, the second stopper allowing a passage of the second flange in a direction opposing the spring force and limiting passage of the second flange in a direction of the spring force, said locating member being pressed and mounted to one of said stopring and said ferrule by an elastic deformation of one of the first and second stoppers.

2. An optical fiber connector unit as defined in claim 1, wherein said first stopper includes a cylindrical portion having a slit extending parallel to an axis of said locating member, and said second stopper comprises a plurality of nibs radially arranged and incliningly projecting towards the axis and towards the rear end of said ferrule, the nibs being elastically deformable to allow the passage of the second flange in the direction opposing the spring force.

3. An optical member as defined in claim 2, wherein said locating member is pressed into said stop ring and engages the inner peripheral surface by an elastic deformation of the cylindrical portion.

4. An optical member as defined in claim 2, wherein the cylindrical portion includes a plurality of removed portions, the nibs being formed on the cylindrical portion in a region of the removed portions.

5. An optical member as defined in claim 2, wherein the nibs project from an end of the cylindrical portion.

6. An optical fiber connector unit as defined in claim 1, wherein said second stopper includes a cylindrical portion having a slit extending parallel to an axis of said locating member and being elastically deformable to allow the passage of the second flange in the direction opposing the spring force, and said first stopper comprises a plurality of nibs radially arranged and inclingly projecting away from the axis and towards the front end of said ferrule.

7. An optical member as defined in claim 6, wherein said locating member is pressed into said stop ring and engages the inner peripheral surface by an elastic deformation of the nibs.

8. An optical member as defined in claim 6, wherein said locating member is pressed onto an outer peripheral surface of said ferrule whereby the cylindrical portion is elastically deformed.

9. An optical fiber connector, comprising:
   (A) An optical fiber cord comprising an optical fiber, an optical fiber strand and a tension member;
   (B) a ferrule having the optical fiber mounted thereto, and comprising:
      (1) a rear end;
      (2) a front end, a through hole extending from the rear end to the front end along a central axis of said ferrule, said through hole being adapted for holding the optical fiber strand insertable from the rear end;
      (3) a first flange defining a portion of said ferrule having the largest diameter thereof, said first flange having a first flange end face facing the rear end of said ferrule; and
      (4) a second flange provided rearwardly relative to said first flange, said second flange having a second flange end face opposing the end face of the first flange;
   (C) a cylindrically shaped stopring surrounding a portion of said ferrule and having an inner peripheral surface, said inner peripheral surface comprising:
      (1) a first step having an end face opposing the end face of the first flange; and
      (2) a second step having an end face opposing the end face of the second flange;
   (D) a coil spring having a first end contacting the end face of the first flange, and a second end contacting the end face of the first step, said coil spring exerting a spring force on said ferrule and said stopring so as to axially urge said ferrule in a direction away from said stopring;

(E) a locating member coaxially provided between said stopring and said ferrule and limiting relative movement of said stopring and said ferrule in a direction of the spring force, said locating member comprising:
  (1) a first stopper contacting the end face of the second step; and
  (2) a second stopper contacting the end face of the second flange, the second stopper allowing a passage of the second flange in a direction opposing the spring force and limiting a passage of the second flange in a direction of the spring force, said locating member being pressed and mounted to one of said stopring and said ferrule by an elastic deformation of one of the first and second stoppers;

(F) a crimp ring bonding the tension member to a rear end of said stopring;

(G) a boot covering said crimp ring; and (H) a plug frame engaging an outer peripheral surface of said stopring.

10. An optical fiber connector as defined in claim 9, further comprising a coupling engaged with an outer periphery of said plug frame.

11. An optical fiber connector as defined in claim 9, wherein said stopring has an outer peripheral surface including a flange-formed projection, and said plug frame has an opening defining an inner peripheral surface, the opening being elastically deformable in a radial direction for engaging with the outer peripheral surface of said stop ring when said stop ring is inserted in said plug frame, and said plug frame includes a protrusion radially projecting inward from the inner peripheral surface of the opening to be engageable with the flange-formed projection.

12. An optical fiber connector as defined in claim 11, wherein the opening includes a pair of removed portions allowing for the elastic deformation, the protrusion being divided by the removed portions.

13. An optical fiber connector as defined in claim 11, wherein said flange-formed projection extends around the entire outer peripheral surface of said stopring.

14. An optical fiber connector as defined in claim 11, wherein said flange-formed projection includes a plurality of removed portions dividing the flange-formed projection into a plurality of sections around the outer peripheral surface, and the protrusion of said plug frame has an axially projecting stopper having a smaller width than a width of the removed portions and being engageable with the removed portion to limit a rotation of said stopring relative to said plug frame.

15. An optical fiber connector as defined in claim 11, wherein the outer peripheral surface of said stopring includes a plurality of axially extending grooves, and the inner peripheral surface of said plug frame includes an axially extending stopper for engaging the grooves to limit a rotation of said stopring relative to said plug frame.

16. An optical fiber connector as defined in claim 15, wherein the outer peripheral surface of said stopring includes a second projection for engaging with the plug frame opening, the second projection having an outer peripheral surface provided with a plurality of grooves engageable with the stopper of said plug frame.

17. An optical fiber connector, comprising:
(A) An optical fiber cord comprising an optical fiber and an optical fiber strand;
(B) a ferrule having the optical fiber mounted thereto, and comprising:
  (1) a rear end, a through hole extending from the rear end along a central axis of said ferrule, the through hole being adapted for holding the optical fiber strand insertable from the rear end of said ferrule;
  (2) a first flange defining a portion of said ferrule having the largest diameter thereof, said first flange having a first flange end face facing the rear end of said ferrule; and
  (3) a second flange provided rearwardly relative to said first flange, said second flange having a second flange end face opposing the end face of the first flange;
(C) a cylindrically shaped stopring surrounding a portion of said ferrule and having an outer peripheral surface including a flange-formed projection, and an inner peripheral surface, said inner peripheral surface comprising:
  (1) a first step having an end face opposing the end face of the first flange; and
  (2) a second step having an end face opposing the end face of the second flange;
(D) a coil spring having a first end contacting the end face of the first flange, and a second end contacting the end face of the first step, said coil spring exerting a spring force on said ferrule and said stopring so as to axially urge said ferrule in a direction away from said stopring, said coil spring maintaining said stopring in a floating condition;
(E) a locating member coaxially provided between said stopring and said ferrule and limiting relative movement of said stopring and said ferrule in a direction of the spring force, said locating member comprising:
  (1) a first stopper contacting the end face of the second step; and
  (2) a second stopper contacting the end face of the second flange, the second stopper allowing a passage of the second flange in a direction opposing the spring force and limiting a passage of the second flange in a direction of the spring force, said locating member being pressed and mounted to one of said stopring and said ferrule by an elastic deformation of one of the first and second stoppers, and said locating member, said stopring and said ferrule being preassembled; and
(F) a plug frame having an opening defining an inner peripheral surface, the opening being elastically deformable in a radial direction for engaging with the outer peripheral surface of said stop ring when said stop ring is inserted in said plug frame, said plug frame including a protrusion radially projecting inward from the inner peripheral surface of the opening engageable with the flange-formed projection; the inner peripheral surface of the opening, the flange-formed projection, and the protrusion each defining circles having first, second and third diameters, respectively, the first diameter being greater or equal to the second diameter, and the second diameter being greater than the third diameter.

* * * * *

UNITED STATES PATENT AND TRADEMARK OFFICE
CERTIFICATE OF CORRECTION

PATENT NO. : 5,436,995
DATED : July 25, 1995
INVENTOR(S) : Takashi YOSHIZAWA; Shigemitsu OGUCHI; Akira NAGAYAMA; Kazunori KANAYAMA; Kuniharu KATO; and Yasuhiro ANDO.

It is certified that error appears in the above-indentified patent and that said Letters Patent is hereby corrected as shown below:

On title page, item [75], Inventors, the sixth inventor's _first_ name should read: --Yasuhiro--.

Signed and Sealed this

Fourteenth Day of November, 1995

Attest:

BRUCE LEHMAN

*Attesting Officer*     *Commissioner of Patents and Trademarks*